April 1, 1958
H. S. KAISER
2,828,989
HOOD LATCH
Filed Nov. 7, 1952
3 Sheets-Sheet 1
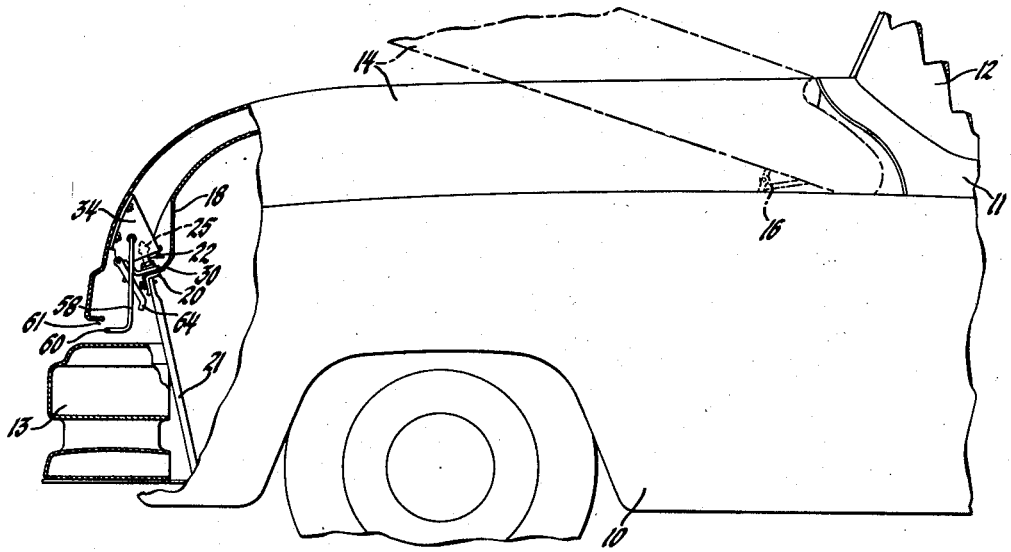
Fig.1
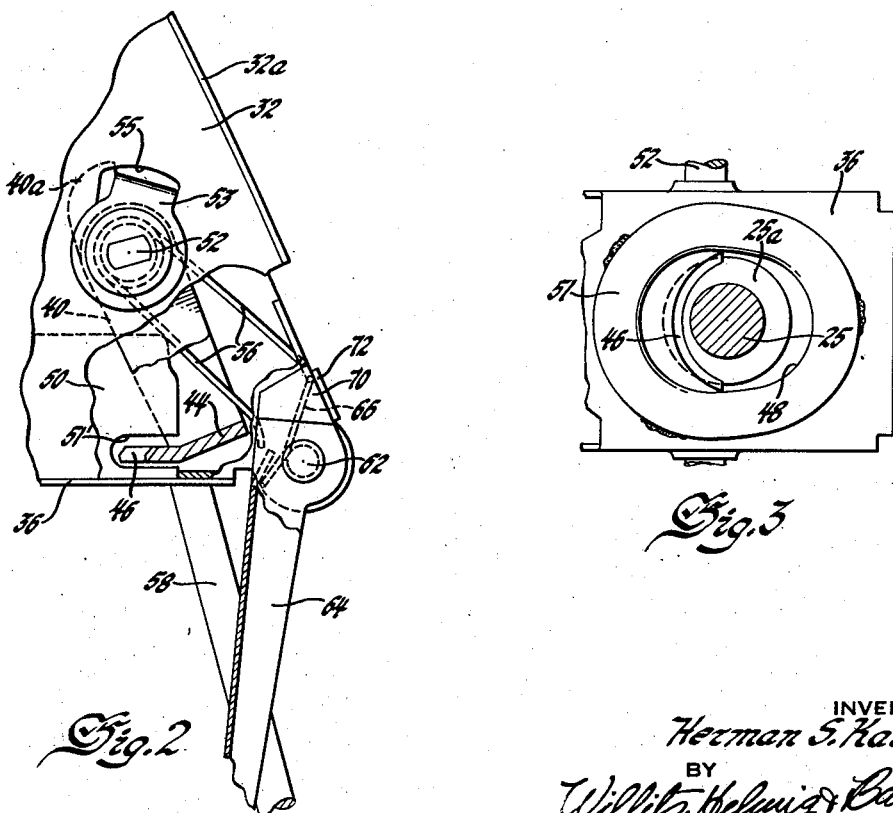
Fig.2
Fig.3
INVENTOR
Herman S. Kaiser
BY
Willits, Helmig & Bailli
ATTORNEYS April 1, 1958

H. S. KAISER 2,828,989

HOOD LATCH

Filed Nov. 7, 1952

INVENTOR
Herman S. Kaiser
BY
Willits, Helwig & Baillio
ATTORNEYS

2,828,989

HOOD LATCH

Herman S. Kaiser, Pontiac, Mich., assignor to General Motors Corporation, Detroit, Mich., a corporation of Delaware Application November 7, 1952, Serial No. 319,270

6 Claims. (Cl. 292—52)

This invention relates to a hood latch, and more particularly to a hood latch having primary latching means and safety latching means with a single operating means for releasing both latching means.

One feature of the invention is that it provides an improved hood latch; another feature of the invention is that it provides a hood latch having primary latch means, secondary or safety latch means and a single operating means for releasing both said latch means; a further feature of the invention is that the single operating means releases the secondary latch subsequently to the release of the primary latch; another feature of the invention is that the single operating means comprises a pivotally mounted rod which is movable in the general direction of hood opening movement to release said latches so that the force utilized in releasing the latches aids in opening the hood; and an additional feature of the invention is that it provides movably mounted primary and secondary latch means on the hingedly mounted hood, and a stationary pilot and catch member carried by the automobile body.

Other features and advantages of the invention will be apparent in the following description and from the drawings, in which:

Fig. 1 is a fragmentary side elevational view of an automobile having the improved hood latch mounted thereon, portions of the body and hood structure being broken away to show underlying parts, and the hood being shown in closed position in solid lines and in open position in broken lines;

Fig. 2 is a fragmentary enlarged section through the improved hood latch, being taken along the line 2—2 of Fig. 5;

Fig. 3 is a section through the hood latch taken along the line 3—3 of Fig. 4;

Figure 4:
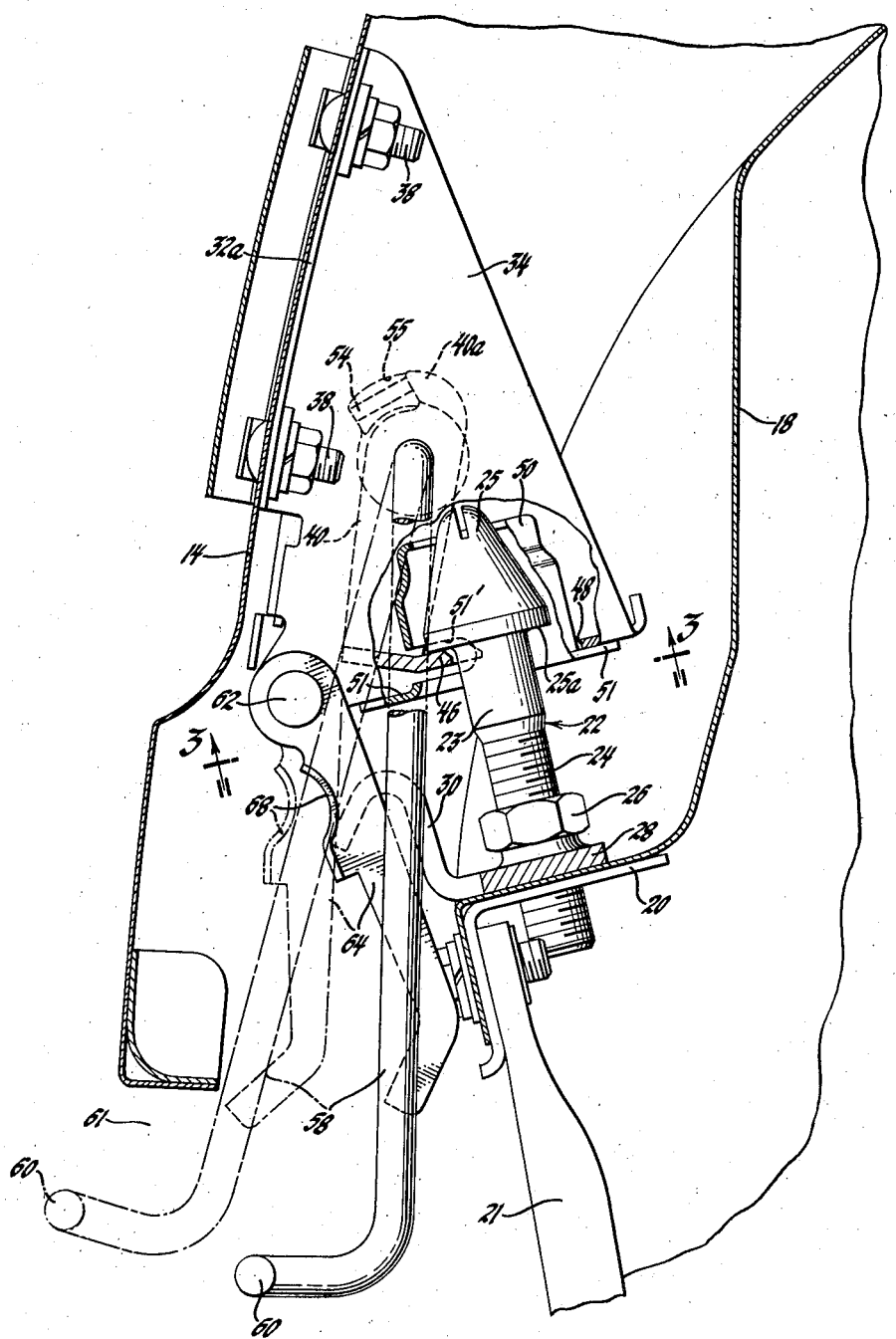
Fig. 4 is an enlarged section similar to a portion of Fig. 1, parts being shown in solid lines in latched position and in broken lines in released position.

Referring now more particularly to the drawings, an automobile has a body including a front fender 10, a cowl 11, a windshield 12 and a bumper and grille structure 13. A hood 14 is hingedly mounted on the automobile body, the hood illustrated being of the so-called alligator or front-opening type mounted by hinges 16 adjacent the rear end of the hood.

A baffle 18 extends forwardly from the automobile radiator (not shown), said baffle being supported on the body at its rear end by the radiator and at its forward end by a support 20 carried on a brace 21.

A pilot designated generally as 22 is fixedly mounted on the automobile body, the pilot having a shank 23 with a threaded portion 24 at one end and a conical head 25 at the other end providing a shoulder 25a. A lock nut 26 is provided so that the pilot 22 is adjustable vertically during installation and assembly of the parts, said pilot being threaded in an opening in a mounting plate 28 which is bolted to the support bracket 20 and which has an integral hook-shaped tongue 30 which projects forwardly of the pilot 22 and which provides a safety catch for the hood latch mechanism, as will be hereinafter described. Preferably the mounting plate 28 may be adjusted transversely of the automobile during assembly of the parts.

The hood latch assembly comprises a supporting bracket which is generally U-shaped, having triangular bracket sides 32 and 34 joined at their base by an apertured portion 36 (Fig. 3). Each of the bracket sides has a flange, 32a and 34a respectively, for securing the supporting bracket to the hingedly mounted hood 14 by means of bolts 38.

A U-shaped primary latch member has arms 40 and 42 joined by a base 44 having an integral latch tongue 46 projecting into an elongated aperture 48 formed in the base 36 of the supporting bracket. As shown best in Figs. 3, 4 and 5 a sleeve 50 is mounted by means of an outwardly bent peripheral flange 51 on the base 36 of the supporting bracket, said sleeve being slotted at 51' along its forward side to receive the latch tongue 46, and said sleeve projecting through the aperture 48 upwardly between the supporting bracket sides 32 and 34 to provide a guide for the conical head 25 of the pilot 22. The sleeve 50 forms a skirt to insure that the latching shoulder 25a of the pilot does not jam against the base 36 of the supporting bracket in the event that the parts are misaligned.

Figure 5:
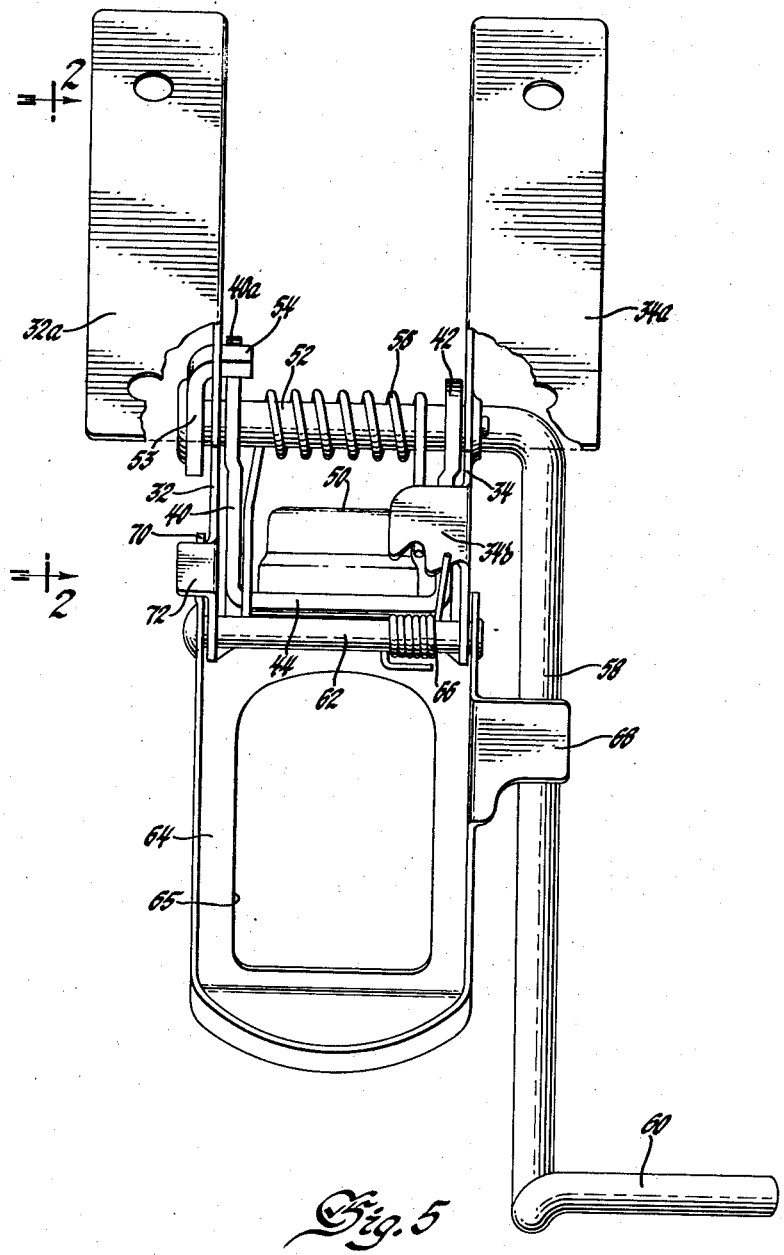
Fig. 5 is a front elevational view of the hood latch removed from the automobile.

The U-shaped latch member is pivotally mounted on a rod 52 which is journaled through aligned apertures in the triangular sides 32 and 34 of the supporting bracket, said rod carrying at its end an actuating member 53 which has a bent ear 54 extending through an arcuate slot 55 in the bracket side 32 and engaging an ear 40a projecting from the arm 40 of the latch member. A torsion spring 56 is coiled about the rod 52 and has one end anchored on an ear 34b bent from the triangular bracket side 34 and the other end anchored on the base 44 of the latch member. The spring 56 biases the latch member into latching position wherein the latch tongue 46 projects into the aperture 48 as shown in Figs. 3 and 4, abutment of the tongue 46 against the shoulder 25a on the pilot 22 preventing withdrawal of the pilot 22 from the aperture 48 and thereby providing a primary latch to lock the hood 14 in closed position.

When the hood moves from open position to closed position, the conical head 25 of the pilot 22 enters the sleeve 50 and cams the latch tongue 46 out of the way against the force of the spring 56.

The rod 52 is bent at right angles and has an actuating portion 58 which extends downwardly and forwardly and which terminates in a handle portion 60 which is so positioned (see Fig. 1) that it can readily be grasped by reaching the fingers through a space 61 between the front end of the hood 14 and the top of the grille and bumper 13.

Pulling forwardly and upwardly on the handle 60 will cause the latch tongue 46 to move to latch release position so that the hood 14 can then be manually raised.

A stud 62 is journaled between the arms 32 and 34 of the supporting bracket, and forms a pivotal support for a secondary latch member 64 having a large central aperture 65 adapted to receive the hook-shaped safety catch 30. A torsion spring 66 which is coiled about the stud 62, serves to bias the secondary latch 64 in a counterclockwise direction as the parts appear in Fig. 4 so that normally the hook 30 projects through the aperture 65 to provide a safety latch which, while its parts 30, 65 are not in positive engagement when the hood is fully closed, will engage and prevent the hood from opening more than two or three inches at the front whenever the primary latch breaks or for any other reason is inoperative. The secondary latch member 64 is formed with an ear 68 which projects into the path of movement of the actuating portion 58 of the latch release rod. As shown best in Fig. 4, the ear 68 normally is spaced from the actuating portion 58, a lug 70 on the secondary latch 64 cooperating with an ear 72 bent outwardly from the bracket member 32 to provide a stop to prevent movement of the secondary latch member 64 beyond the position shown in Fig. 4.

In order to release the latch the handle 60 is grasped and pulled forwardly and upwardly. Initial movement of the release means acts upon only the primary latch tongue 46 and subsequent to the actuation of the primary latch the same forward and upwardly movement of the release means operates to release the safety latch through engagement of the ear 68 with the rod portion 58 of the release means.

The latch above described not only combines release of the primary and the safety latch in one operation, but also provides an improved hood latch wherein the releasing force is in the general direction of force applied to open the hood, so that the force which is used to release the latch aids in opening the hood.

While I have shown and described one embodiment of my invention, it is capable of many modifications. Changes, therefore, in the construction and arrangement may be made without departing from the spirit and scope of the invention as set forth in the appended claims.

I claim:

1. A hood latch of the character described adapted to be mounted on an automobile body and hood, including: a support member adapted to be mounted on the hood and having a guide opening therein; a movable primary latch member mounted on said support member and having a portion extending into said opening; a pilot adapted to be fixedly mounted on said body, said pilot projecting through said opening when the hood is closed and having a shoulder adapted to be engaged by said primary latch member to lock said hood in closed position; a secondary latch member adapted to be mounted on said hood; a catch member adapted to be mounted on said body and cooperable with said secondary latch member when said hood is closed to provide a safety latch; and a single operating means adapted to be mounted on said hood for releasing said primary and secondary latch members.

2. A hood latch of the character described adapted to be mounted on an automobile body and hood, including: a support member adapted to be mounted on the hood and having a guide opening therein; a movable primary latch member mounted on said support member and having a portion extending into said opening; a conical pilot adapted to be fixedly mounted on said body, said pilot projecting through said opening when the hood is closed and having a shoulder adapted to be engaged by said primary latch member to lock said hood in closed position; a secondary latch member adapted to be mounted on said hood; a catch member adapted to be mounted on said body and cooperable with said secondary latch member when said hood is closed to provide a safety latch; and a single operating means comprising a rod adapted to be movably mounted on said hood for releasing said primary latch member and for subsequently releasing said secondary latch member.

3. Apparatus of the character claimed in claim 2, wherein said rod extends below the hood and is accessible through a space between the body and hood.

4. Apparatus of the character claimed in claim 2, wherein said rod extends below the hood and is accessible through a space between the body and hood, said rod being movable in the general direction of hood opening movement to release both said latches, the latch members being released and the hood being moved to open position in a single operation.

5. A hood latch of the character described adapted to be mounted on an automobile body and hood, including: a support member adapted to be mounted on the hood and having a guide opening therein; a primary latch member pivotally mounted on said support member and having a portion extending into said opening; a conical pilot adapted to be fixedly mounted on said body, said pilot projecting through said opening when the hood is closed and having a shoulder adapted to be engaged by said primary latch member to lock said hood in closed position; a secondary latch member adapted to be pivotally mounted on said hood; a catch member adapted to be fixedly mounted on said body and cooperable with said secondary latch member when said hood is closed to provide a safety latch; and a single operating means comprising a rod adapted to be pivotally mounted on the hood for releasing said primary and secondary latch members, said secondary latch member having a portion lying in the path of movement of said pivotally mounted rod.

6. Apparatus of the character claimed in claim 5, wherein said pivotally mounted rod is movable in the direction of hood opening movement to release the primary latch member and subsequently to release the secondary latch member, both latch members being released and the hood being opened in a single movement.

References Cited in the file of this patent

UNITED STATES PATENTS

| | | |
|---|---|---|
| 2,079,556 | Hynes | May 4, 1937 |
| 2,145,968 | Bozarth | Feb. 7, 1939 |
| 2,193,132 | Hynes | Mar. 12, 1940 |
| 2,253,660 | Tell | Aug. 26, 1941 |